A. C. TAYLOR.
ELECTRIC WELDING MACHINE.
APPLICATION FILED JUNE 26, 1913.

1,196,613.

Patented Aug. 29, 1916.
4 SHEETS—SHEET 1.

ATTESTS:
W. C. Waddell
E. M. Fisher

INVENTOR
Albertis C. Taylor
by Fisher & Moser
ATTYS.

A. C. TAYLOR.
ELECTRIC WELDING MACHINE.
APPLICATION FILED JUNE 26, 1913.

1,196,613.

Patented Aug. 29, 1916.
4 SHEETS—SHEET 3.

A. C. TAYLOR.
ELECTRIC WELDING MACHINE.
APPLICATION FILED JUNE 26, 1913.

1,196,613.

Patented Aug. 29, 1916.
4 SHEETS—SHEET 4.

ATTESTS:
W. C. Waddell
E. M. Fisher

INVENTOR
Albertis C. Taylor
BY Fisher & Moser
ATTYS.

UNITED STATES PATENT OFFICE.

ALBERTIS C. TAYLOR, OF WARREN, OHIO, ASSIGNOR TO THE WINFIELD MANUFACTURING COMPANY, OF WARREN, OHIO, A CORPORATION.

ELECTRIC WELDING-MACHINE.

1,196,613.  Specification of Letters Patent.  Patented Aug. 29, 1916.

Application filed June 26, 1913. Serial No. 775,890.

*To all whom it may concern:*

Be it known that I, ALBERTIS C. TAYLOR, citizen of the United States, residing at Warren, in the county of Trumbull and State of Ohio, have invented certain new and useful Improvements in Electric Welding-Machines, of which the following is a specification.

This invention relates to an electric welding machine, and the invention consists in the improved construction and combination of parts substantially as shown and described and particularly pointed out in the claims.

Figure 1:
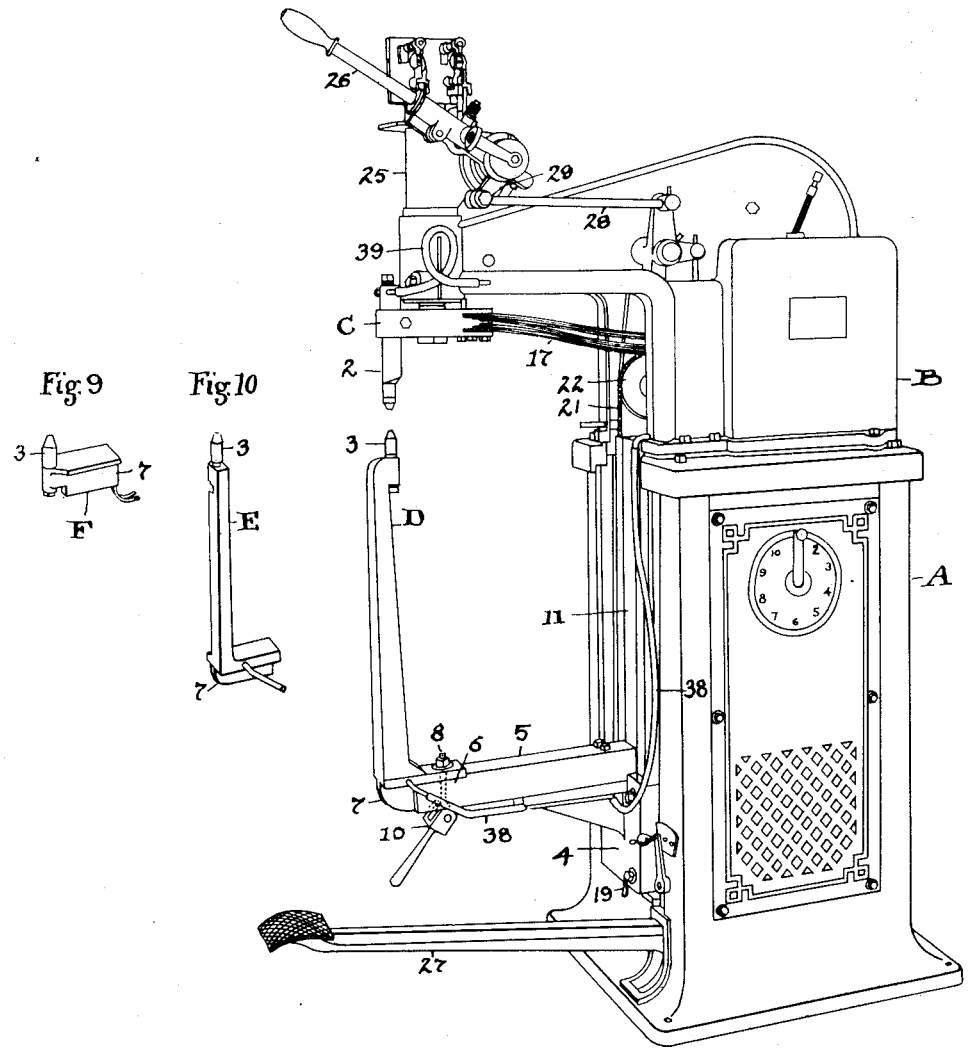
Figure 2:
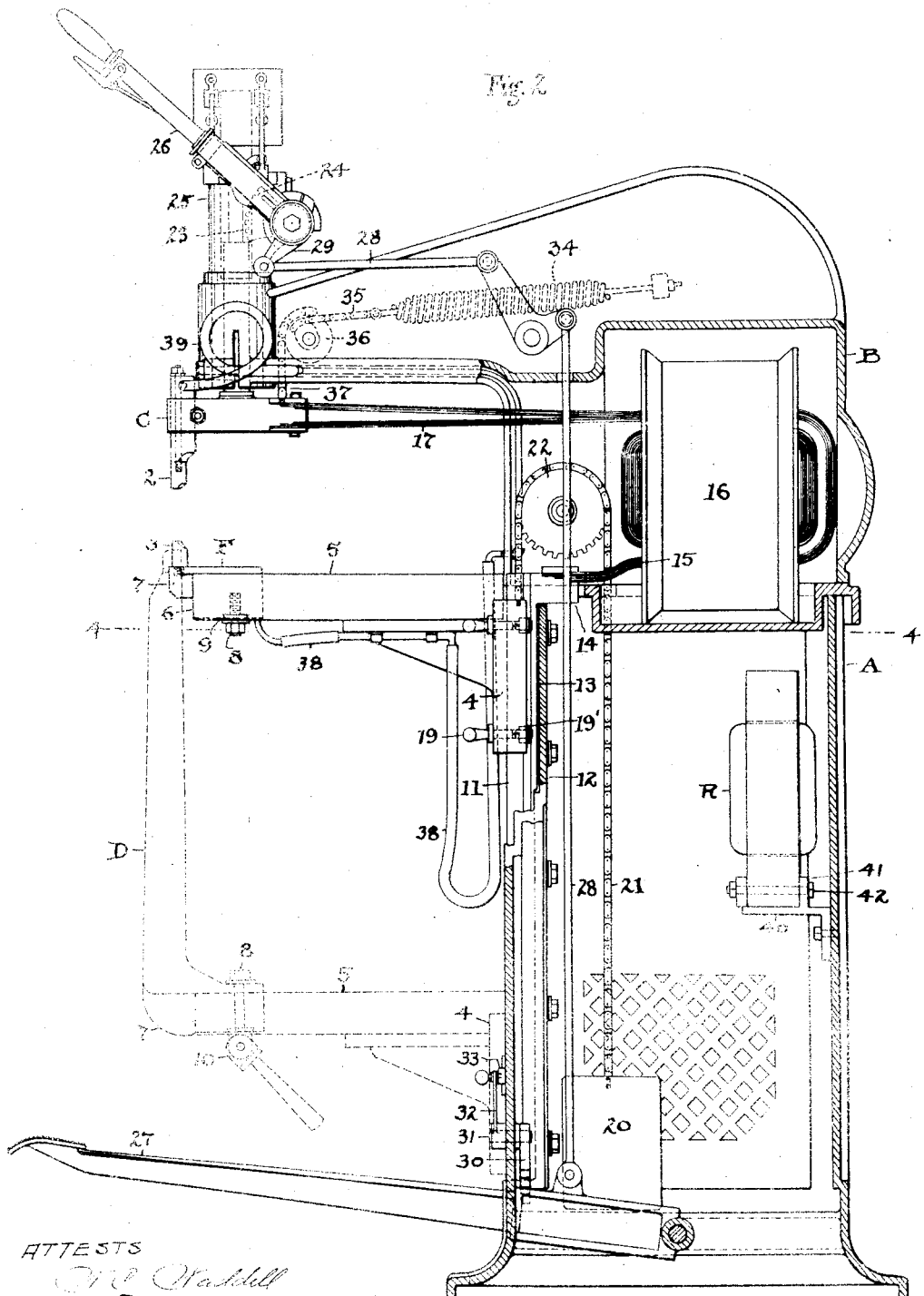
Figure 3:
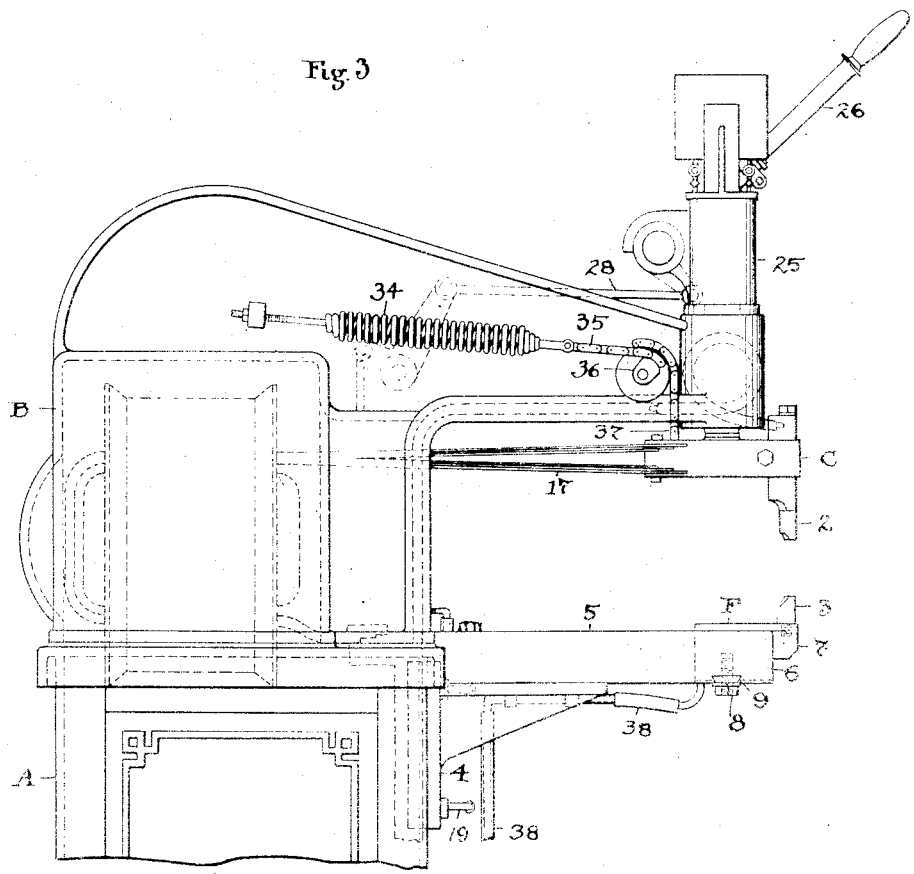
Figure 4:
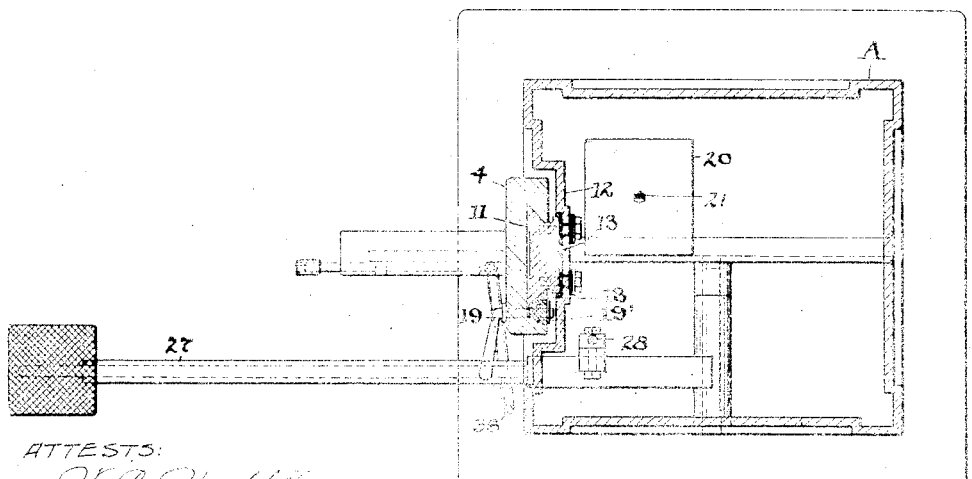
Figure 5:
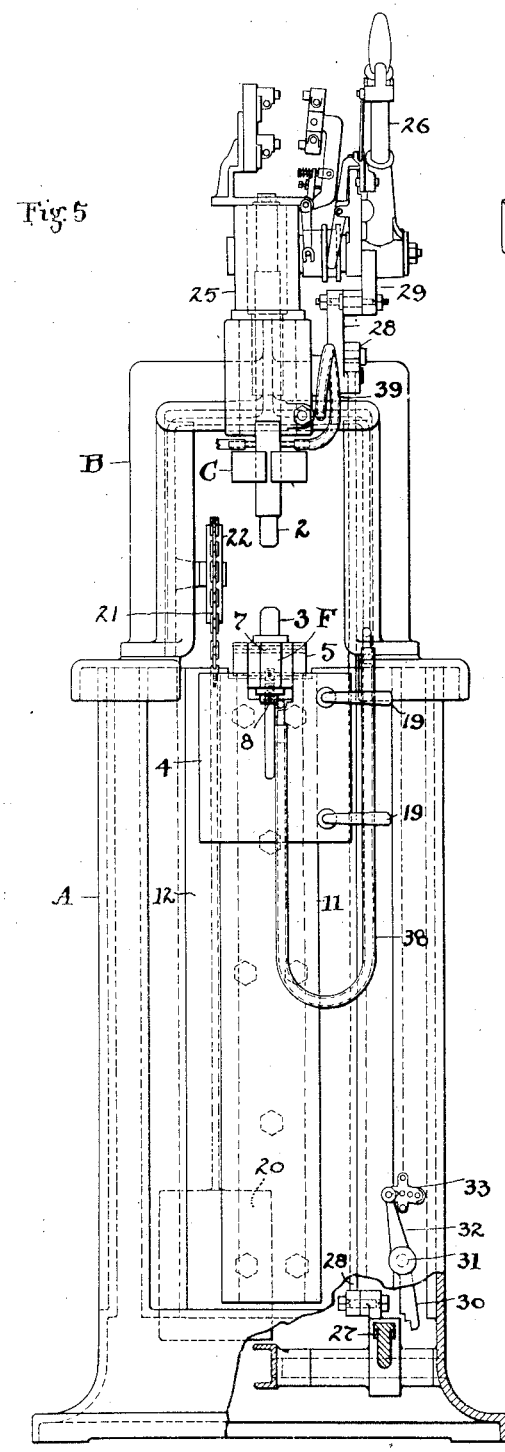
Figure 6:
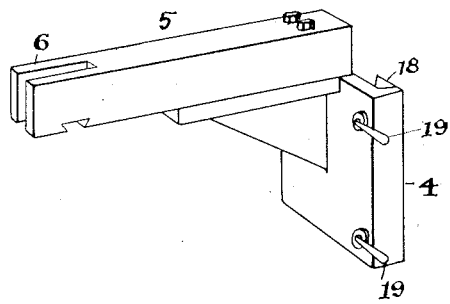
Figure 7:
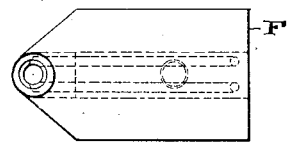
Figure 8:
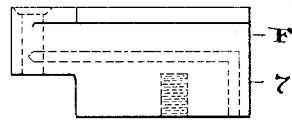

In the accompanying drawings, Figure 1 is a perspective view of a complete machine embodying my improvements. Fig. 2 is a vertical sectional view and elevation of the machine enlarged somewhat as compared with Fig. 1. Fig. 3 is a side elevation of the upper portion of the machine opposite to the side shown in Fig. 1. Fig. 4 is a cross section looking down on a line corresponding substantially to 4—4, Fig. 2. Fig. 5 is a front elevation of the machine sectioned away at its lower right hand corner to disclose certain internal parts hereinafter fully described. Fig. 6 is a perspective view of the lower arm or horn and its slidable support, and Figs. 7 and 8 are a plan and a side view respectively of one form of an electrode holder adapted to be secured to said horn. Fig. 9 is a perspective view of the holder shown in Figs. 7 and 8, and Fig. 10 is a perspective view of a still further modified form of electrode holder which is adapted to be used interchangeably with the electrode holders shown in Figs. 1 and 9.

The machine as thus shown belongs more especially to the spot welding type of electric welders and comprises certain novel features of construction making for convenience and efficiency of operation as will now appear. Thus, A represents the hollow base or body of the machine and B a cap or top therefor having a forwardly projecting arm which carries a vertically movable holder C for a spot-welding electrode 2. A corresponding electrode 3 is upheld below the first by supporting means comprising a slide 4, the bar or arm 5, and any one of the holders D, E or F. It will be noticed that the upper electrode is constructed and arranged to be raised and lowered within limits by its holder C and the lower electrode 3 is adapted to occupy a fixed position in respect thereto by either of the holders D, E or F, see Figs. 1, 9 and 10, when detachably secured to the bar or arm 5. These holders are interchangeable to facilitate operations on different kinds of work and for this reason bar 5, which is of solid copper and in one sense a terminal member for the transformer, is slotted at its end 6 to receive and seat the T-shaped base 7 of the respective holders D, E and F. Locking of the holder is accomplished by a bolt 8 screwed into the bottom of the holder and seated upon a cross piece 9 as shown in Fig. 2, or by a combined bolt 8 and eccentric lever 10 as shown in Fig. 1. The latter construction is preferred as it provides for an adjustable setting of the holder inward or outward as desired upon bar 5. This bar or arm is removably bolted to the slide, which is also made of solid copper to serve as a conductor for the electric current, and the body part of this slide has a dove-tailed channel at its rear slidably engaged with the vertically disposed dove-tailed guide member 11, which is bolted to the recessed front wall 12 of body B but also electrically insulated therefrom by suitable insulating material 13 interposed between the metal parts. Guide member 11 is a solid copper piece having a short lateral extension 14 at its upper end (Fig. 2) to which the secondary bands 15 of the transformer 16 are fastened. The other end 17 of the secondary bands is secured to holder C.

Slide 4 is solidly secured at any elevation on guide member 11 by a bevel-edged gib 18 and hand controlled screws 19 and nuts 19' at one side. In order that the slide 4 and its parts may be easily and readily shifted and held at any desired elevation, a counter-weight 20 is attached by chain 21 to the said slide, said chain running over a wheel 22 located within the top B of the machine.

The upper holder C has a limited vertical adjustment or movement downward obtained by a rack bar 23 and a pinion or gear 24 mounted in head 25. A hand lever 26 on the shaft of said pinion may be used to operate the same alone or said pinion can be indirectly operated by means of the foot treadle 27 and a line of link and lever connections 28 extending to an arm 29 on the shaft of said pinion. A perfect control of said upper holder in its relation to the work and to the lower holder and electrode is possible by these means, and which control is further augmented by definitely limiting the movement of the holder C in greater or less degree, by means of a stepped stop arm 30 which is pivoted in the base of body B on a rotatable shaft 31 and controlled by a hand lever 32 on the outside of the casing. Lever 32 is adapted to adjustably engage in or with any one of a series of segmentally disposed holes in an index plate 33 secured to base A, Figs. 2 and 5. One or another of the said steps can thus be brought over the end of treadle 27 to limit the upward movement of the said treadle and incidentally the relation of the electrodes to each other, under the pull of the spring 34 which controls the upward movement of the said holder C by a chain 35 secured to the small end of a double pulley 36, and by a chain 37 to the large end of said pulley. Means for cooling the electrodes or their immediate supports comprise flexible water pipe and hose connections 38 and 39 to the said supports of the electrodes from a suitable source or supply, as may be available.

Several important improvements are present in this machine over all the prior art familiar to me, and these include the vertically slidable support and electric-current conducting guide for the lower holder by means of which I am enabled to use interchangeable holders or supports of varying elevation and form for the lower electrode according to the work to be done. For example, if the bottom of a bucket were to be welded the holders D or E would be used in lieu of holder F which is better adapted for flat superposed plates. It is important that all the parts involved should be good conductors of the electric current and be so constructed and arranged as to work with the least possible resistance whether one form or another of holder be employed. This result is obtained by the construction shown and in which the guide 11 and slide 4 as well as the bar or arm 5 are of solid copper fastened in close working relation. The counter-balance 20 makes the movement of said slide and holder up and down easy and convenient and the hand screws 19 through the bevel edged gib 18 fasten the slide upon the guide in close working relations as to both position and electric current.

In Fig. 2 I show a bracket 40 bolted to the inside of body B and provided with a single flange 41 through which the regulator coil R is secured by bolt 42 to said bracket. The operating connection between hand lever 26 and foot treadle 27 is such that when the said lever is operated the treadle can be automatically disconnected therewith and remain idle, the arm 29 controlled by the treadle serving to effect the disengagement of said parts with each other. Both electrode holders have counter-balancing means, the upper holder being preferably by a spring supported upon top B instead of upon the operating parts, and the lower holder being preferably by a weight on account of the distance it has to travel.

What I claim is:

1. In an electric welding machine, a fixed conducting guide member having transformer connections directly attached thereto and a holder adjustably engaged thereon, a gib at one edge of said parts and hand controlled screws engaged through said holder into said gib and adapted to tighten the gib on said parts.

2. In an electric welding machine, a fixed conducting guide member and a lower electrode holder of conducting material slidably adjustable thereon, in combination with a movable upper electrode holder and means to adjustably fix a relative set position thereof in respect to the said lower holder.

3. An electric welding machine having adjustable upper and lower electrode holders, means to adjustably fix the limit of movement of said holders independently of each other, and counterbalancing means for both of said holders.

4. An electric welding machine having an upwardly movable holder for a welding electrode, and means to adjustably fix the limit of upward movement of said holder, in combination with means adapted to raise said holder automatically to its adjusted limits.

5. An electric welding machine having an upper and a lower electrode, a holder for the lower electrode slidably mounted on a current-conducting support, means to fix said holder in adjusted position, and means to facilitate the movement of said holder vertically on said support.

6. An electric welding machine having movable upper and lower electrode holders, a lever and means to depress said upper holder, a treadle in the bottom of the machine and operating connections therefrom to said lever, and separate counter-balancing lift means for said holders.

7. An electric welding machine having a lower electrode and a holder therefor, and a conducting support on which said holder is slidably mounted, and transformer connections secured to said support, in combination with a counter-weight for said holder.

8. An electric welding machine having an electrode holder and actuating means therefor comprising a treadle and connections therefrom with said holder adapted to depress the same, and a graduating stop to engage the treadle and limit the return movement thereof and the electrode holder.

In testimony whereof I affix my signature in presence of two witnesses.

ALBERTIS C. TAYLOR.

Witnesses:
  JESSIE G. GATES,
  W. D. BYARD.